United States Patent Office 2,780,558
Patented Feb. 5, 1957

2,780,558

PRODUCTION OF IMPROVED PIGMENTS

Oswin B. Wilcox, New Castle, Del., assignor to E. I. du Pont de Nemours and Company, Wilmington, Del., a corporation of Delaware No Drawing. Application July 22, 1953,
Serial No. 369,715

4 Claims. (Cl. 106—300)

This invention relates to the manufacture of improved pigmentary substances, and more particularly to a process for surface coating a pulverulent material with alumina. More specifically, it pertains to improved methods for manufacturing improved titanium dioxide pigments to impart desired color retention and other properties to such pigments.

In the manufacture of titanium dioxide pigments, it has been demonstrated, as exemplified by U. S. Patents Nos. 2,357,101 and 2,284,772, that surface coating the pigments while in aqueous suspension with alumina by chemical neutralization of soluble salts of aluminum produces white titanium dioxide pigments of improved color retention properties, particularly in synthetic resin baking enamel formulations. The sulfate process for obtaining $TiO_2$ pigments, as described in U. S. Reissue Patents 18,854 and 18,790, entails the dissolving of ilmenite ore in sulfuric acid to obtain a titanium sulfate solution which on hydrolysis yields a hydrous titanium oxide precipitate which is subsequently washed and calcined to produce the final pigment. Because residual soluble salts are present in the calcined product, the latter is usually subjected to wet finishing treatments which include wet grinding and some form of washing or decantation to eliminate such salts from the final product. Thereafter, the product is filtered, dried and dry ground to obtain a pigment of requisite texture. In the above-noted processes, wherein aqueous precipitation of alumina on the titanium dioxide pigment can be readily effected, no additional wet slurrying steps are required.

On the other hand, in the production of titanium dioxide pigment by the vapor phase oxidation of titanium tetrachloride with an oxidizing agent in accordance with, for example, the procedures of U. S. Patent No. 2,488,-439, the pigment base, particularly when after-calcined to eliminate traces of residual chlorides, is free from soluble salts and comprises a dry pigment base. It is therefore most economically finished to optimum pigment fineness by subjecting the calciner discharge to a dry grinding step in, for example, a fluid energy mill such as described in U. S. Patent 2,032,827, known as a "micronizer," conveniently operated by the use of superheated steam as the conveying gas. To introduce a wet processing step in such procedures for the alumina treatment would be very costly.

It is among the objects of this invention to improve upon prior procedures for alumina-treating pigmentary materials, and especially $TiO_2$ pigments, and to provide novel methods for surface coating such heat-stable, pulverulent materials with alumina, and especially an improved process for manufacturing titanium dioxide. A further object is to provide an improved method for imparting color retention properties to a titanium dioxide pigment and without recourse to prior wet processing methods. Another, particular object is to provide a novel process for imparting improved color stability to titanium dioxide pigment obtained by the vapor phase oxidation of a titanium halide, such as titanium tetrachloride. Other objects and advantages of the invention will be apparent from the ensuing description thereof.

These and other objects are accomplished in this invention which comprises dry grinding a pigmentary substance in the presence of a minor amount of an aluminum alkoxide, and recovering the treated pigment product.

In a more specific embodiment, the invention comprises mixing from about .1 to 10 percent by weight of an aluminum alkoxide, such as aluminum isopropoxide, with a titanium dioxide pigment, subjecting the resulting mixture to dry grinding in a fluid energy mill with superheated steam, and recovering the product of improved color stability which results.

In practically adapting the invention in accordance with one preferred embodiment, a finely divided titanium dioxide pigment, such as is obtained from the vapor phase oxidation, at temperatures ranging from 950–1100° C., of titanium tetrachloride with an oxygen-containing gas such as air, humidified with from .1 to 10%, and in accordance with, for example, U. S. Patent 2,488,439, is first intimately mixed with 1–4 percent by weight of aluminum isopropoxide. Such admixture or incorporation can be conveniently effected by adding a dilute solution of the aluminum compound in an inert solvent, such as carbon tetrachloride, to said pigment, as by spraying said solution onto the titanium dioxide pigment while spread out on a tray, a moving belt, or while retained within a tumbling barrel or other type mixer. Further and more uniform distribution and intimate association of the aluminum isopropoxide can be obtained, if desired, by subjecting the treated pigment to mechanical blending treatment, as by passing it through a hammer mill, high-speed mixer, or other type of disintegrating machine or mill. The resulting aluminum-isopropoxide-treated pigment is then dry ground or pulverized in suitable pigment grinding equipment, preferably in a fluid energy mill, such as a micronizer of the type described in U. S. 2,032,827, to obtain desired texture, fineness and color retention properties. In such mill the pigment particles are conveyed in a plurality of streams from jets by a gaseous fluid such as superheated steam into the outer portion of an inwardly spiraling vortex at high velocity and in a manner which will maintain the vortex at a high rotative speed and a relatively small inward speed to cause the pigment particles to rub or strike against each other or against breaker plates within the mill. The superheated steam thus serves simultaneously to hydrolyze the aluminum isopropoxide on the finely divided pigment particle surfaces as they are formed, and to furnish the energy required for the grinding. The titanium dioxide pigment particles become desirably surface coated with alumina hydrolyzed "in situ" by the steam, and become more effective on a weight basis in exhibiting improved color retention properties over those containing alumina precipitated from aqueous solution, or even those produced by co-oxidation of aluminum chloride with titanium tetrachloride. This color retention improvement is particularly effective where the pigment is employed as a pigmenting ingredient for white refrigerator enamel formulations, as for example, the synthetic resin formulations, where high temperature baking is used to obtain a hard durable paint film.

To a clearer understanding of the invention, the following specific examples are given, which are merely illustrative and not in limitation of the invention. Parts given are by weight.

*Example 1*

3600 parts of titanium dioxide produced by the vapor phase oxidation of titanium tetrachloride were calcined to remove adsorbed chlorine to give a rutile titanium dioxide pigment base. This pigment was spread out on a tray and a solution of 72 parts of aluminum isopropoxide dissolved in 160 parts of carbon tetrachloride was sprayed thereover. The treated pigment was then passed for further mixing treatment through a hammer mill type grinder, known as a mikropulverizer, with the screen removed. Such screen removal causes the mikropulverizer to function as a mixer rather than a pulverizer. The thoroughly mixed aluminum-isopropoxide-treated pigment was then passed through an 8-inch micronizer at a rate of 300 parts per minute, using steam at 100 p. s. i. and 550° F. for the feed jet and ring. Another portion of the same pigment was micronized in the same manner but without the addition of the aluminum isopropoxide treatment. These two pigments then were ground separately in a paint mill in a baking enamel formulation and comparison coatings of the two enamels were applied side by side to a steel panel. Both coatings appeared to be of equal whiteness. The panel was then baked in an oven at 180° C. for 75 minutes with the result that the coating containing the untreated control pigment was badly yellowed compared to the coating containing the aluminum-isopropoxide-treated pigment.

*Example II*

Rutile titanium dioxide pigment, produced by vapor phase oxidation of titanium tetrachloride vapor with air at about 1000° C. in a continuous type reactor, followed by calcination at about 700° C., was sprayed with a 10 percent solution of aluminum isopropoxide in perchlorethylene during its passage on a traveling belt conveyor entering a hammer mill disintegrator with the fine screen removed. The amount of aluminum isopropoxide added to the titanium dioxide pigment was equivalent to .5 percent by weight calculated as $Al_2O_3$. On discharge from the disintegrator, the treated pigment was passed into a fluid energy mill at a rate of 1500 pounds per hour, conveyance therethrough being effected by means of superheated steam at about 100 p. s. i. with approximately 100 degrees (°F.) of superheat. The finished titanium dioxide recovered exhibited highly improved color retention properties, as shown in the table below wherein it is designated Sample IIa.

A sample prepared from the same pigment base but without the added alumina surface coating treatment was similarly micronized but exhibited very poor color retention properties. This sample is designated as IIb in said table.

Another portion of the same pigment was alumina treated by subjection to the following wet precipitation procedure: A 175 gram per liter water slurry of the pigment was made up in an agitated tank and sufficient NaOH added until the alkalinity rose to pH 9.6. A solution of aluminum sulfate was then added to give the equivalent of a 1.3 percent $Al_2O_3$ by weight based on the titanium dioxide. The alkalinity was then readjusted back to pH 8 with ammonium hydroxide and the sample filtered, dried, and subjected to the fluid energy milling treatment in the micronizer, as described above. This sample was practically equal to the standard pigment in its color retention properties and is designated as IIc in the table below.

*Example III*

A rutile titanium dioxide pigment containing .7 percent by weight of $Al_2O_3$ was obtained by the vapor phase co-oxidation of titanium tetrachloride and a small amount aluminum chloride with air at 1000° C. in a continuous reactor, followed by calcination treatment at 700° C. to give a pigment base. This pigment was finished by micronizing with added aluminum isopropoxide and in accordance with the procedure of Example II. It exhibited exceptional color retention properties and is designated as IIIa in the table below.

A similar sample, finished without the added aluminum isopropoxide treatment, gave a pigment with mediocre color retention and is designated as IIIb in said table.

Another, similarly obtained $TiO_2$ pigment sample was treated with the aqueous alumina precipitation process used in the preparation of pigment IIc, to provide a total alumina content therein of 1.0. The color retention of this product, designated Sample IIIc in the table below, was only slightly better than that obtained for sample IIIb.

TABLE

| Sample Designation | Percent $Al_2O_3$ Added by Co-Oxid. | Percent $Al_2O_3$ Added by Wet Ppt. | Percent $Al_2O_3$ Added as Alum. Isopropoxide | Percent $Al_2O_3$ Added, Total | Degree of Color Change |
|---|---|---|---|---|---|
| IIa | | | .5 | .5 | .013 |
| IIb | | | | 0 | .033 |
| IIc | | 1.3 | | 1.3 | .011 |
| IIIa | .7 | | .5 | 1.2 | .000 |
| IIIb | .5 | | | .5 | .022 |
| IIIc | .5 | .5 | | 1.0 | .018 |

The color retention characteristics and values referred to herein and given in the above table were obtained in accordance with standard procedures by making up paints of the pigment in melamine-urea-alkyd enamel, applying a film to undercoated steel panels, baking the applied film in an oven at 150° C. for 45 minutes, and exposing the panels to the light in a normal inside room for a period of one year. The "degree of color change" determination was made by examining the panels on a spectrophotometer known as the Hunter reflectometer (described in J. Research. National Bureau Science 25, 581 (1940), RP 1345 by R. S. Hunter). the grading of the panels is described in another paper by the same author entitled "Photoelectric Tristimulus Colorimetry With Three Filters," in the circular of the National Bureau of Science C 429, issued July 30, 1942. In this reference, in paragraph IV, 8 on page 22, the yellowness of white and near white surfaces is given as:

$$Y(\text{yellowness}) = \frac{A(\text{amber}) - B(\text{blue})}{G(\text{green})}$$

The values for this expression were determined before and after exposure of the baked panel, and in relation to a standard pigment similarly exposed. Thus, the change in test sample compared to the change in a standard sample is designated herein as the "degree of color change." The standard sample used was a white titanium dioxide pigment of commerce manufactured according to the teachings of U. S. Patent 2,284,272, having excellent color retention properties. An important significant difference in color retention is indicated by a "degree of color change" of ".003."

As above noted, effective distribution of the aluminum alkoxide on the pigmentary particles can be effected in any desired manner, as by spraying or otherwise distributing the alkoxide over the surface of the pigment, in the form of dilute organic solution of said alkoxide in an inert organic solvent, such as the various alcohols, hydrocarbons, chlorinated hydrocarbons, and the like. The solution concentration can be regulated according to the alkoxide as well as the type mixing equipment used. For example, a 5-10 percent solution of aluminum isopropoxide in perchlorethylene is easily sprayed because of its low viscosity. More complete distribution is obtained by subjecting the treated pigment base to a dry mixing operation. For example, the treated pigment can be passed through a ribbon mixer, a barrel type tumbler with lifting flights, a hammer mill type disintegrator with an open screen, or with no screen. All these are types of mechanical dry mixing or handling useful in obtaining the required intimate mixing.

While aluminum isopropoxide has been described as a preferred aluminum alkoxide for use herein, selection thereof is essentially based on the relative low cost and ease of preparation as well as availability of that compound. Obviously, aluminum alkoxides generally, such as aluminum alcoholates and phenylates, including aluminum methoxide, aluminum ethoxide, aluminum propoxide, aluminum butoxide, aluminum isobutoxide, aluminum pentoxide, aluminum phenoxide, and the like, or mixtures thereof, and in the amounts mentioned above, can be used.

The dry grinding treatment of the thoroughly uniformed mixture of titanium dioxide base pigment and the solution of aluminum alkoxide is done as above noted in the presence of superheated water vapor. In the micronizer, superheated steam can be used as the conveying gas, and thus intimately contacts the treated pigment simultaneously as new pigment surfaces are being formed due to particle attrition in the mill, hydrolytically splitting the aluminum alkoxide "in situ," and providing the desired coating of alumina uniformly over the surface of the finished pigment. Steam pressures and temperatures used for normal operation of the micronizer are satisfactory to cause the instantaneous hydrolytic splitting. Thus, steam at a pressure of 150#/sq. in. may be used at 450° F. or at any superheat temperature convenient to obtain the desired pigment fineness, and also maintain "dry" conditions within the micronizer.

Other types of dry grinding equipment can be used. For example, a hammer mill type disintegrator having a fine screen may be used, feeding in superheated steam to assist in forcing the pigment through the disintegrating screens and simultaneously causing hydrolytic precipitation of the alumina on the surface of the titanium dioxide particles.

Other advantages are inherent in the surface treatment of alumina from hydrolytically split aluminum alkoxides. Improvement in titanium dioxide pigment chalk resistance, and initial color are usually noted along with the improvement in color retention. Furthermore, no undesirable soluble salts or salt residues are introduced into the pigment, as the organic reaction product is volatile and is automatically separated from the pigment along with the conveying gas of fluid energy mill.

The term "titanium dioxide pigment" refers to any finely divided pigmentary form of titanium dioxide, either pure or extended, before final processing has been completed, as well as to a finished form of such pigment to which it is desired to add the treating agent of this invention.

The preferred application of the invention is to titanium dioxide pigments prepared by a dry process such as the vapor phase oxidation of titanium tetrachloride. It is within the scope of the invention, however, to apply it to any dry titanium dioxide pigment, whether or not wet processing steps are employed in its manufacture. Thus, the invention is applicable to the treatment of such base pigments as anatase or rutile titanium dioxide resulting from the well-known sulfate process, titanium, calcium or barium base pigments prepared by co-precipitation or by dry blending processes, anatase or rutile titanium dioxide prepared by the vapor phase oxidation process, and the like. Furthermore, any heat-stable pigment or pulverulent material, including zinc sulfide, zinc oxide, lithopone, etc., pigments, can be beneficially alumina treated in accordance with the invention.

I claim as my invention:

1. A process for preparing an alumina-coated titanium pigment, comprising hydrolyzing alumina on the surfaces of the finely divided pigment by mixing from about .1–10% by weight of an aluminum alcoholate with said pigment, subjecting the mixture to dry grinding in the presence of superheated water vapor, and recovering the resulting product.

2. A process for preparing an alumina-coated titanium pigment, comprising hydrolyzing alumina on the surfaces of the finely divided pigment by mixing from about .1–10% by weight of an aluminum alcoholate in an organic solvent with said pigment, subjecting the mixture to dry grinding in the presence of superheated water vapor, and recovering the resulting product.

3. A process of preparing an alumina-coated titanium dioxide pigment, comprising hydrolyzing alumina on the surfaces of the finely divided pigment by mixing .1 to 10 percent by weight of aluminum isopropoxide with said pigment, subjecting the mixture to fluid energy milling in the presence of superheated steam, and recovering the resulting pigment product.

4. A process for preparing an alumina-coated titanium oxide pigment which comprises hydrolyzing alumina onto the surfaces of said pigment by mixing it with from about .1–10% by weight of an aluminum alkoxide selected from the group consisting of an alcoholate and phenylate, subjecting the resulting mixture to dry grinding in the presence of superheated steam, and recovering the resulting product.

References Cited in the file of this patent
UNITED STATES PATENTS
2,357,101    Geddes _____ Aug. 29, 1944